(12) United States Patent
Clark

(10) Patent No.: US 6,533,257 B1
(45) Date of Patent: Mar. 18, 2003

(54) COMPOSITE VIBRATION DAMPING SYSTEM

(75) Inventor: Arthur E. Clark, Adelphi, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/888,632

(22) Filed: Jun. 21, 2001

(51) Int. Cl.$^7$ ................................................ F16F 13/00
(52) U.S. Cl. ..................................... 267/140.15; 700/54
(58) Field of Search .......................... 267/136, 140.11, 267/140.12, 140.14, 140.15; 188/378, 379, 380; 700/54

(56) References Cited

U.S. PATENT DOCUMENTS

| | | | | |
|---|---|---|---|---|
| 6,163,077 A | * | 12/2000 | Lucas | 290/1 R |
| 6,342,776 B1 | * | 1/2002 | Taylor et al. | 320/107 |
| 6,378,672 B1 | * | 4/2002 | Wakui | 188/378 |

* cited by examiner

*Primary Examiner*—Jack Lavinder
*Assistant Examiner*—C. T. Bartz
(74) *Attorney, Agent, or Firm*—Jacob Shuster

(57) ABSTRACT

Plural vibration damping devices transmit to and receive energy from a distributor that is programmed to either dissipate the vibration induced energy produced by the devices or redistribute the vibration induced energy produced by some of the devices to minimize overall vibration without introduction of energy from an external source.

6 Claims, 2 Drawing Sheets

COMPOSITE VIBRATION DAMPING SYSTEM

The present invention relates in general to a method for damping vibration, involving the use of high damping materials.

BACKGROUND OF THE INVENTION

Apparatus and methods which relate to electromechanical damping of vibration from sources such as machinery, involving passive/active operational modes, are generally known in the art as disclosed for example in U.S. Pat. No. 5,899,443 to Su. The use of rare earth magnetostrictive materials for magnetomechanical damping of vibration is also known, as disclosed in articles of A. E. Clark, et al., such as "Magnetomechanical Damping In Giant Magnetostriction Alloys," published November 1995 and "Zero Field Damping Capacity In $(Tb_x Dy_{1-x}) Fe_y$", published Apr. 15, 1996. It is therefore an important object of the present invention to provide an efficient system or method of damping vibration by use of high damping materials, such as the foregoing referred to magnetostrictive materials, without introduction of energy from some external source.

SUMMARY OF THE INVENTION

In accordance with the present invention, a plurality of damping devices involving magnetostrictive materials are interrelated in a composite system to minimize vibration without introduction of electrical energy from some external source. Toward that end, each of the damping devices acting as a generator transmits electrical current to an energy distributor for dissipation of vibration induced energy only under passive mode conditions, and may be excited to act as a motor by reception of electrical current redistributed by the energy distributor under an active mode of operation. Both the passive and active operational modes are programmed to minimize vibration while avoiding use of-energy from some external source.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
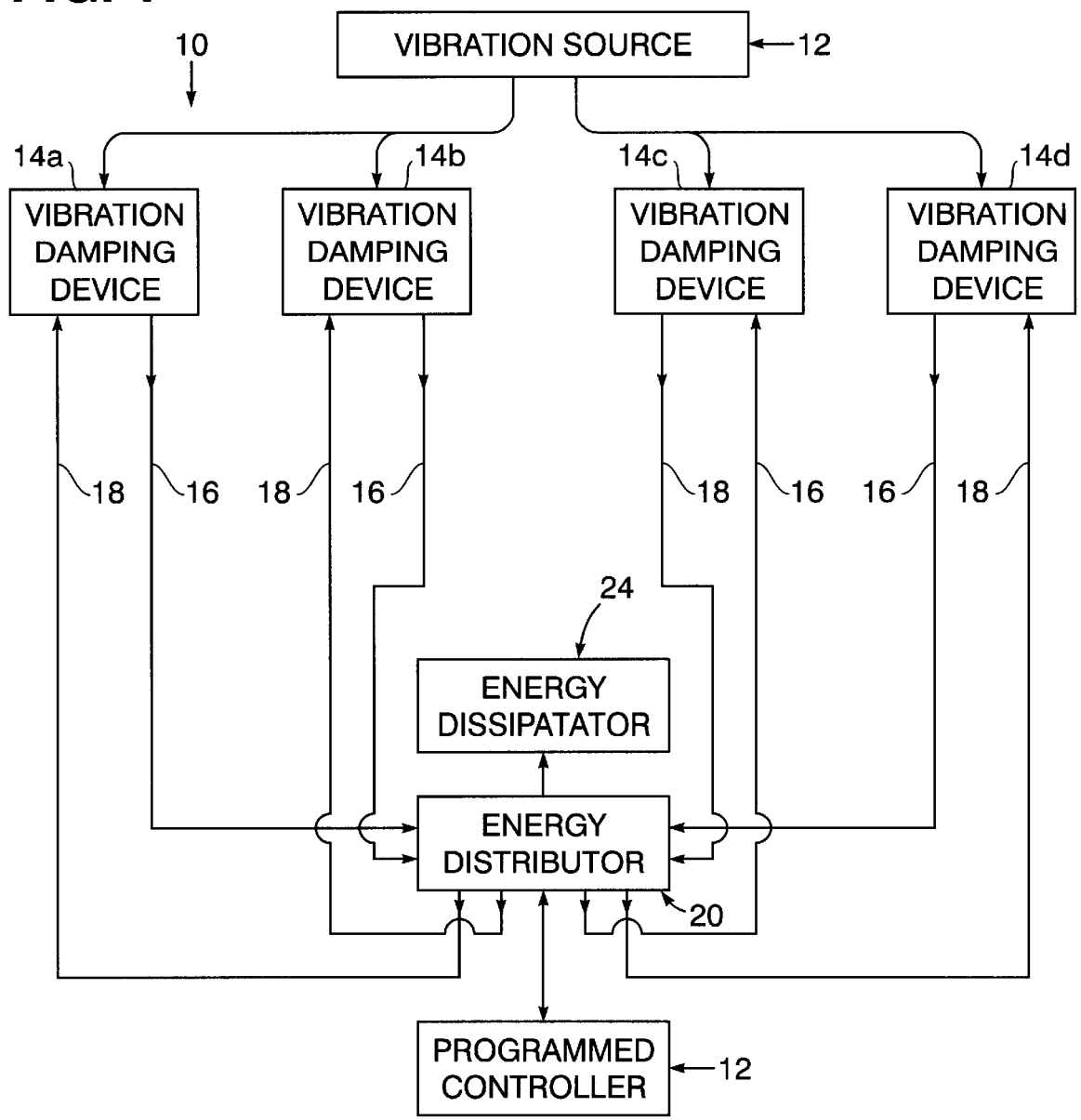
FIG. 1 is a block diagram depicting the system of the present invention in accordance with one embodiment thereof.

Referring now to the drawing in detail, a system 10 is diagrammed in FIG. 1 for damping vibration from an external source 12 with which it is associated, such as power operated machinery. According to one embodiment, the vibration source 12 has a plurality of vibration damping devices 14a, 14b, 14c and 14d positioned thereon within which electrical energy is produced in response to vibration. Such vibration damping devices 14 generally known in the art as hereinbefore referred to, involve use of magnetostrictive type vibration damping materials together with piezoelectric material. Pursuant to the present invention, each of such vibration damping devices 14 when vibrated by the source 12 transmits vibration-induced electrical energy along a current conducting path 16, and may also be electrically excited by electrical energy received along a current conducting path 18. Such current conducting paths 16 and 18 respectively extend between the devices 14a, 14b, 14c and 14d and an energy distributor 20, such as a microchip under programmed control of a controller 22. The energy distributor 20 is also connected to an energy dissipatator 24, involving an electrical resistor to which the energy may be transferred during a passive vibration mode of operation as hereinafter explained.

Figure 2:
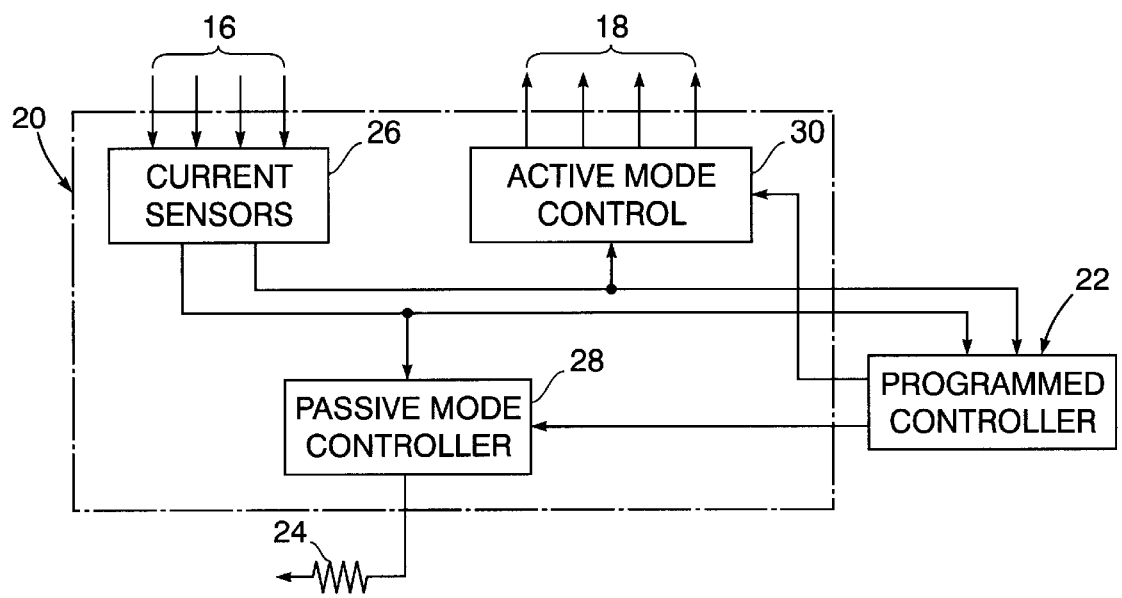
FIG. 2 is a block diagram illustrating in greater detail components of the energy distributor diagrammed in FIG. 1.

Referring now to FIG. 2, current sensors 26 are associated with the energy distributor 20 receiving the outputs of the damping devices 14 through the current conducting paths 16. When the devices 14 acting as generators are vibrated under low energy conditions insufficient to power the controller 22 in order to initiate an active mode of operation, the currents then produced and transmitted in the paths 16 are detected by sensors 26. The energy associated with such currents is transferred in a passive mode by control 28 to the energy dissipatator 24. Such passive mode operation instituted through the control 28 occurs in response to preprogrammed signals from the controller 22. When other vibration conditions, sufficient to support an active mode of operation, is detected by the sensors 26 the programmed controller 22 signals the active mode control 30, as diagrammed in FIG. 2, for energy redistribution through the current conducting paths 18 so as to excite some of the devices 14 which then behave as motors at the expense of the other devices 14, based on current magnitude and phase when both magnetostrictive and piezoelectric materials are associated with each of the devices 14. Such programming of the controller 22 thereby minimizes vibration through the vibration damping devices 14 without introduction of any energy from some external source.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a plurality of devices involving use of damping materials operatively positioned in relation to a source of vibration for passive and active modes of operation; the improvement residing in: current conducting means respectively connected to each of the devices for respectively transmitting energy to and from each of the devices; and energy distributing means connected by said current conducting means to the devices for respectively dissipating the energy therefrom under the passive mode of operation and redistributing the energy produced by less than all of the devices under the active mode of operation to minimize the vibration without introduction of energy other then the energy submitted by the said devices as a result of the said source of vibration.

2. The improvement as defined in claim 1, wherein said energy distributing means includes: sensor means connected to the current conducting means through which the energy may be transmitted from all of the devices simultaneously.

3. The combination as defined in claim 2, wherein said damping materials include magnetostrictive types.

4. The combination as defined in claim 1, wherein said damping materials include magnetostrictive types.

5. In combination with a plurality of energy devices involving use of damping materials operatively positioned in relation to a source of vibration for damping said vibration under programmed passive and active modes of operation;

the improvement residing in the steps of: detecting vibration induced energy produced by the devices acting as generators to effect dissipation of the vibration induced energy under the passive mode of operation; and redistributing the vibration induced energy under the active mode amongst the devices when some of the devices are acting as motors to avoid introduction of energy other then the energy submitted by the said devices as a result of the said source of vibration while minimizing the vibration.

6. The combination as defined in claim 5, wherein said damping materials include magnetostrictive types.

* * * * *